United States Patent
Peng et al.

(10) Patent No.: US 12,425,904 B2
(45) Date of Patent: Sep. 23, 2025

(54) METHOD AND APPARATUS FOR MEASURING SIDELINK REFERENCE SIGNAL RECEIVED POWER, AND COMMUNICATIONS DEVICE

(71) Applicant: VIVO MOBILE COMMUNICATION CO., LTD., Guangdong (CN)

(72) Inventors: Shuyan Peng, Guangdong (CN); Zichao Ji, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 447 days.

(21) Appl. No.: 17/839,768

(22) Filed: Jun. 14, 2022

(65) Prior Publication Data

US 2022/0312252 A1    Sep. 29, 2022

Related U.S. Application Data

(63) Continuation of application No. PCT/CN2020/137142, filed on Dec. 17, 2020.

(30) Foreign Application Priority Data

Dec. 24, 2019 (CN) .......... 201911350899.9

(51) Int. Cl.
*H04W 24/10* (2009.01)
*H04B 17/318* (2015.01)
*H04L 5/00* (2006.01)
*H04W 92/18* (2009.01)

(52) U.S. Cl.
CPC .......... *H04W 24/10* (2013.01); *H04B 17/318* (2015.01); *H04L 5/0051* (2013.01); *H04W 92/18* (2013.01)

(58) Field of Classification Search
CPC ..... H04W 24/10; H04W 92/18; H04B 17/318
See application file for complete search history.

(56) References Cited

U.S. PATENT DOCUMENTS

| | | |
|---|---|---|
| 2017/0181011 A1 | 6/2017 | Yu et al. |
| 2017/0215097 A1 | 7/2017 | Park et al. |
| 2018/0019794 A1 | 1/2018 | Kowalski et al. |
| 2019/0200366 A1 | 6/2019 | Park et al. |

(Continued)

FOREIGN PATENT DOCUMENTS

| | | |
|---|---|---|
| CN | 106982184 A | 7/2017 |
| CN | 106993260 A | 7/2017 |

(Continued)

OTHER PUBLICATIONS

ZTE, SANECHIPS, NR sidelink physical layer structure, 3GPP TSG RAN WG1 #98, R1-1908894, Aug. 26-30, 2019, Prague, CZ.

(Continued)

*Primary Examiner* — Jackie Zuniga Abad
(74) *Attorney, Agent, or Firm* — Price Heneveld LLP

(57) ABSTRACT

Embodiments of the present disclosure disclose a method and an apparatus for measuring sidelink reference signal received power, and a communications device. The method for measuring sidelink reference signal received power is applied to a terminal and includes: determining a measurement port for a sidelink reference signal; and obtaining reference signal received power based on the determined measurement port.

14 Claims, 2 Drawing Sheets

(56) References Cited

U.S. PATENT DOCUMENTS

| | | | |
|---|---|---|---|
| 2020/0015176 A1* | 1/2020 | Li | H04L 1/1861 |
| 2020/0067610 A1 | 2/2020 | Lee et al. | |
| 2020/0220669 A1* | 7/2020 | Park | H04L 1/1861 |
| 2021/0058899 A1 | 2/2021 | Lee et al. | |
| 2022/0070855 A1* | 3/2022 | Zhang | H04W 72/51 |
| 2022/0116129 A1* | 4/2022 | Ying | H04B 7/0617 |
| 2023/0043213 A1* | 2/2023 | Hwang | H04W 4/40 |

FOREIGN PATENT DOCUMENTS

| | | | |
|---|---|---|---|
| CN | 108882314 A | 11/2018 | |
| CN | 109392069 A | 2/2019 | |
| CN | 110383721 A | 10/2019 | |
| EP | 3576321 A1 | 12/2019 | |
| WO | 2019087371 A1 | 5/2019 | |
| WO | 2019216627 A1 | 11/2019 | |
| WO | WO-2021063195 A1 * | 4/2021 | H04B 17/327 |

OTHER PUBLICATIONS

Nokia, Introduction of NR V2X, 3GPP TSG-RAN WG1 Meeting #99, R1-1913643, Nov. 18-22, 2019, Reno, USA.

Huawei, Hisilicon, Discussion on Sidelink L3 RSRP and CSI reporting in NR SL, 3GPP TSG-RAN WG2 Meeting #108, RZ-1915984, Nov. 18-22, 2019, Reno, USA.

Vivo, "Remaining aspects for NR V2X", 3GPP TSG-RAN WG1 Meeting #101, R1-2003386, e-Meeting, May 25-Jun. 5, 2020.

Vivo, "Remaining aspects for NR V2X", 3GPP TSG-RAN WG1 Meeting #100bis, R1-2001668, e-Meeting, Apr. 20-30, 2020.

Huawei, "Transmit diversity solutions for R15 sidelink", 3GPP TSG RAN WG1 Meeting #90, R1-1712097, Prague, Czech Republic, Aug. 21-25, 2017.

Samsung, "On Physical Layer Procedures for NR V2X", 3GPP TSG RAN WG1 #98, R1-1908481, Aug. 26-30, 2019, Prague, CZ.

Intel Corporation, "Summary#1 for AI 7.2.4.2.2 Mode-2 Resource Allocation", 3GPP TSG RAN WG1 Meeting #98bis, R1-1911347, Oct. 14-20, 2019, Chongqing, China.

Nokia, "Introduction of NR V2X", 3GPP TSG-RAN WG1 Meeting #99, R1-1913191, Nov. 18-22, 2019, Reno, USA.

Huawei, "Sidelink physical layer procedures for NR V2X", 3GPP TSG RAN WG1 Meeting #99, R1-1911887, Reno, USA, Oct. 14-20, 2019.

CATT, "Sidelink physical layer procedures in NR V2X", 3GPP TSG RAN WG1 Meeting #98bis, R1-1910332, Chongqing, China, Oct. 14-20, 2019.

Huawei, Hisilicon, "Sidelink physical layer procedures for NR V2X", 3GPP TSG RAN WG1 Meeting #99, R1-1911887, Reno, USA, Nov. 18-22, 2019.

* cited by examiner

METHOD AND APPARATUS FOR MEASURING SIDELINK REFERENCE SIGNAL RECEIVED POWER, AND COMMUNICATIONS DEVICE

CROSS-REFERENCE TO RELATED APPLICATIONS

The present application is a bypass continuation application of International Application No. PCT/CN2020/137142 filed on Dec. 17, 2020, which claims priority to Chinese Patent Application No. 201911350899.9, filed in China on Dec. 24, 2019, which are incorporated herein by reference in their entirety.

TECHNICAL FIELD

The present disclosure relates to the field of communications technologies, and in particular, to a method and an apparatus for measuring sidelink reference signal received power, and a communications device.

BACKGROUND

In a sidelink (SL) in the related art, reference signal received power (RSRP) measurement based on an physical sidelink shared channel (PSSCH) demodulation reference signal (DMRS) is supported; and measured RSRP may be used as reference RSRP to calculate a path loss, and may be used for SL open-loop power control, or may be used in autonomous resource selection mode (mode 2) to determine whether a resource is occupied, or the like.

During RSRP measurement, if DMRS transmission is based on two ports or two layers, a transmit end cannot measure a level of RSRP detected by a receive end. Consequently, the path loss calculation is inaccurate, and compensation effects are unbalanced for different links, or inaccurate detection causes a collision in a resource selection and makes system throughput performance worse.

SUMMARY

According to a first aspect, an embodiment of the present disclosure provides a method for measuring sidelink reference signal received power. The method is applied to a terminal and includes:
determining a measurement port for a sidelink reference signal; and
obtaining reference signal received power based on the determined measurement port.

According to a second aspect, an embodiment of the present disclosure further provides an apparatus for measuring sidelink reference signal received power. The method is applied to a terminal and includes:
a processing module, configured to determine a measurement port for a sidelink reference signal; and
an obtaining module, configured to obtain reference signal received power based on the determined measurement port.

According to a third aspect, an embodiment of the present disclosure further provides a communications device. The communications device includes a processor, a memory, and a computer program stored in the memory and capable of running on the processor. When the processor executes the computer program, the steps of the foregoing method for measuring sidelink reference signal received power are implemented.

According to a fourth aspect, an embodiment of the present disclosure provides a computer-readable storage medium. The computer-readable storage medium stores a computer program. When the computer program is executed by a processor, the steps of the foregoing method for measuring sidelink reference signal received power are implemented.

According to a fifth aspect, an embodiment of the present disclosure provides a computer program product. The program product is executed by at least one processor to implement the foregoing method for measuring sidelink reference signal received power.

According to a sixth aspect, an embodiment of the present disclosure provides an apparatus for measuring sidelink reference signal received power. The apparatus is configured to perform the foregoing method for measuring sidelink reference signal received power.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION OF EMBODIMENTS

Figure 1:
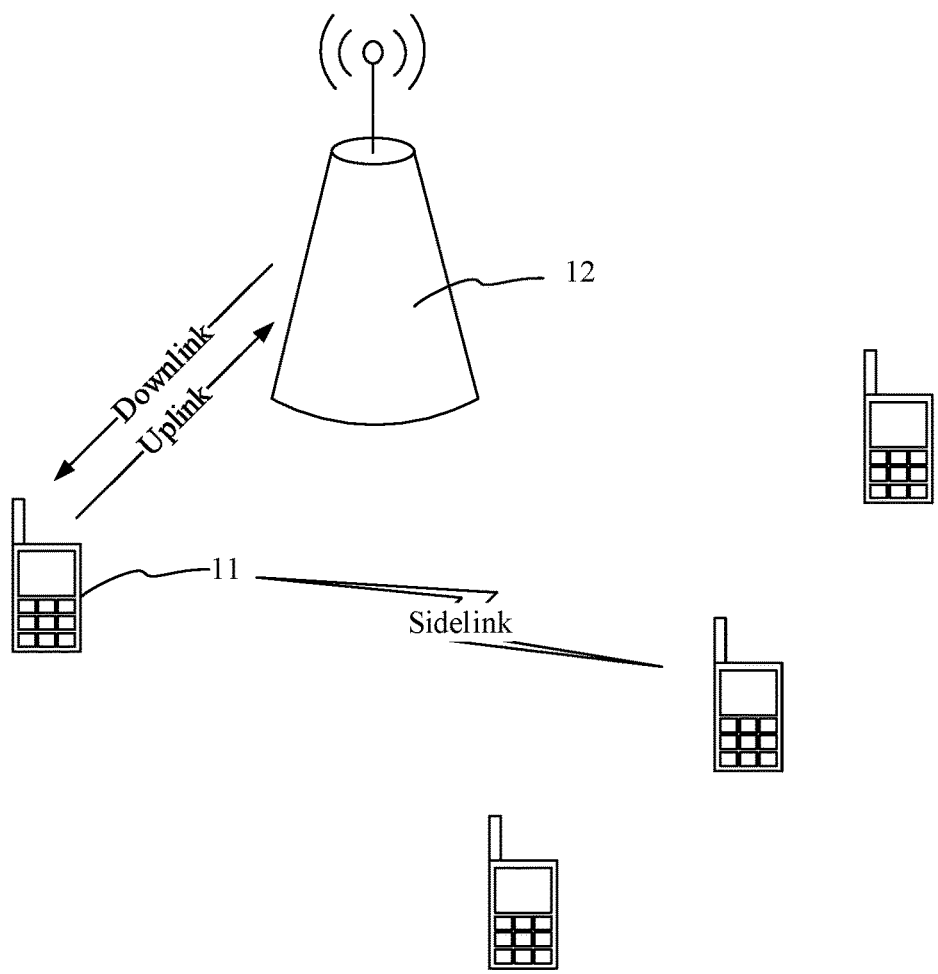
FIG. 1 presents a block diagram of a mobile communications system to which an embodiment of the present disclosure may be applied.

The following describes exemplary embodiments of the present disclosure in more detail with reference to the accompanying drawings. Although the exemplary embodiments of the present disclosure are shown in the accompanying drawings, it should be understood that the present disclosure may be implemented in various forms and should not be limited by the embodiments set forth herein. On the contrary, the embodiments are provided to enable a more thorough understanding of the present disclosure and completely convey the scope of the present disclosure to a person skilled in the art.

The terms "first", "second", and the like in this specification and claims of this application are used to distinguish between similar objects instead of describing a specific order or sequence. It should be understood that the numbers used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. The term "and/or" in this specification and claims indicates at least one of connected objects.

Technologies described herein are not limited to a Long Time Evolution (LTE)/LTE-Advanced (LTE-A) system, and can also be used in various wireless communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" are usually used interchangeably. The CDMA system can implement radio technologies such as CDMA2000 and universal terrestrial radio access (UTRA). The UTRA includes wideband CDMA (Wideband Code Division Multiple Access, WCDMA) and other CDMA variants. The TDMA system can implement radio technologies such as the global system for mobile communications (GSM). The OFDMA system can implement radio technologies such as ultra mobile broadband (UMB), evolved UTRA (Evolved-UTRA, E-UTRA), IEEE 802.11 (Wi-Fi), IEEE 802.16 (WiMAX), IEEE 802.20, and Flash-OFDM. The UTRA and E-UTRA are parts of a universal mobile telecommunications system (UMTS). The LTE and more advanced LTE (such as LTE-A) are new UMTS releases that use the E-UTRA. The UTRA, E-UTRA, UMTS, LTE, LTE-A, and GSM are cited from descriptions of the documentation by the organization named "3rd Generation Partnership Project" (3GPP). The CDMA2000 and UMB are cited from descriptions of the documentation by the organization named "3rd Generation Partnership Project 2" (3GPP2). The technologies described in this specification may be used for the foregoing systems and radio technologies, and may also be used for other systems and radio technologies. However, in the following descriptions, an NR system is described for an illustration purpose, and NR terms are used in most of the following descriptions, although these technologies may also be applied to other applications than the application in NR systems.

Examples provided in the following description are not intended to limit the scope, applicability, or configuration described in the claims. Functions and arrangements of discussed elements may be changed without departing from the spirit and scope of the present disclosure. Various examples may be omitted or replaced properly, or various procedures or components may be added. For example, the described method may be performed in an order different from the described order, and steps may be added, omitted, or combined. In addition, features described with reference to some examples may be combined in other examples.

FIG. 1 is a block diagram of a wireless communications system to which an embodiment of the present disclosure may be applied. The wireless communications system includes a terminal 11 and a network-side device 12. The terminal 11 may also be referred to as a terminal device or user equipment (UE). The terminal 11 may be a terminal-side device such as a mobile phone, a tablet computer (Tablet Personal Computer), a laptop computer, a personal digital assistant (PDA), a mobile Internet device (MID), a wearable device, or a vehicle-mounted device. It should be noted that a specific type of the terminal 11 is not limited in this embodiment of the present disclosure. The network-side device 12 may be a base station or a core network. The base station may be a base station 5G or a later release (for example, a gNB or a 5G NR NB), or a base station in another communications system (for example, an eNB, a WLAN access point, or another access point), or a location server (for example, an E-SMLC or an LMF (Location Manager Function)). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specific technical term. It should be noted that only a base station in an NR system is used as an example in some embodiments of the present disclosure, but a specific type of the base station is not limited.

Under control of a base station controller, the base station may communicate with the terminal 11. In various examples, the base station controller may be a part of the core network or some base stations. Some base stations may communicate control information or user data with the core network by using backhauls. In some examples, some of these base stations may communicate with each other directly or indirectly by using backhaul links. The backhaul links may be wired or wireless communications links. The wireless communications system may support operations on a plurality of carriers (wave signals of different frequencies). A multi-carrier transmitter can transmit modulated signals on the plurality of carriers simultaneously. For example, multi-carrier signals modulated by using various radio technologies may be transmitted on each communications link. Each modulated signal may be sent on different carriers and may carry control information (for example, a reference signal or a control channel), overhead information, data, and the like.

The base station may perform wireless communication with the terminal 11 by using one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, or a picocell base station). The base station may also use different radio technologies, for example, a cellular or WLAN radio access technology. The base station may be associated with same or different access networks or operator deployments. Coverage areas of different base stations (including coverage areas of base stations of a same type or different types, coverage areas using a same radio technology or different radio technologies, or coverage areas of a same access network or different access networks) may overlap each other.

A communications link in the wireless communications system may include an uplink for carrying uplink (UL) transmission (for example, from the terminal 11 to the network-side device 12), or a downlink for carrying downlink (DL) transmission (for example, from the network-side device 12 to the terminal 11), or a sidelink (SL) for carrying transmission from the terminal 11 to another terminal 11. UL transmission may also be referred to as reverse link transmission, and DL transmission may also be referred to as forward link transmission. A licensed band, an unlicensed band, or both may be used for downlink transmission. Similarly, a licensed band, an unlicensed band, or both may be used for uplink transmission.

The long term evolution (LTE) system supports an SL for performing data transmission directly between terminals (User Equipment, UE) without using a network device.

A design of an LTE sidelink is applicable to specific public safety affairs (for example, emergency communication on a fire site or a disaster site such as an earthquake), vehicle to everything (V2X) communication, or the like. Vehicle to everything communication includes various services, for example, basic security communication, advanced driving (self-driving), platooning, and sensor extension. Because the LTE sidelink supports only broadcast communication, the LTE sidelink is mainly used for basic security communication. Other advanced V2X services with strict quality of service (QoS) requirements in terms of latency and reliability will be supported by a new radio (NR) sidelink.

A terminal sends sidelink control information (SCI) through a physical sidelink control channel (PSCCH), and schedules transmission of a physical sidelink shared channel (PSSCH) to send data.

Sidelink transmission is mainly divided into several transmission forms: broadcast, groupcast, and unicast. As the name implies, unicast is one to one transmission; groupcast is one to many transmission; and broadcast is also one to many transmission, broadcast does not include the concept that terminals belong to a same group.

In sidelink in the related art, reference signal received power (RSRP) measurement based on an PSSCH demodulation reference signal (DMRS) is supported; and measured RSRP may be used as reference power to calculate a path loss, and may be used for SL open-loop power control, or may be used in autonomous resource selection mode (mode 2) to determine whether a resource is occupied, or the like.

Layer 1 (L1) RSRP is measured on a PSCCH port and/or a PSSCH port, and layer 3 (L3) RSRP is weighted L1 RSRP measured by a terminal in a period of time.

RSRP used for open-loop power control is L3 RSRP measured and reported by the terminal, and L3 RSRP used for power control is weighted L1 RSRP measured based on the PSSCH port or measured based on the PSCCH port. A value of L1 RSRP is used in mode 2 to determine whether a resource is occupied, and the L1 RSRP is the L1 RSRP measured based on the PSCCH port or the PSSCH port. A higher layer configures whether the measurement is performed based on the PSCCH port or based on the PSSCH port.

NR V2X defines two modes: In mode 1, a base station schedules the resource. In mode 2, the terminal itself determines which resource will be used for transmission. In this case, resource information may come from a broadcast message of the base station or is preconfigured. In mode 2 resource allocation mode, a transmit end needs to perform sensing, including demodulating SCI, obtaining an RSRP threshold, and comparing the measured RSRP value with the obtained RSRP threshold to determine whether the resource is occupied.

In the related art, the open-loop power control on the SL is adjusted based on the L3 RSRP reported by the terminal. The RSRP is measured based on the PSSCH DMRS. For the PSSCH DMRS, the SCI may indicate single-port transmission or two-port transmission. During RSRP measurement, if the DMRS is transmitted based on two ports, the terminal needs to define whether the measurement is performed based on one of the two ports or based on the two ports. Otherwise, a transmit end cannot measure, based on a reported result, a level of RSRP detected by a receive end. Consequently, compensation effects of different links may be unbalanced, and system throughput performance becomes worse.

In a period of time, the transmit end may perform single-port transmission at some moments and two-port transmission at some moments. When the receive end calculates L3 RSRP, weighting based on a measurement result of a specific port needs to be defined. Otherwise, the transmit end cannot accurately estimate a level of RSRP detected by the receive end, resulting in inaccurate SL open-loop power control, causing poor interference coordination in the system, and making system throughput performance worse.

In addition, in mode 2 resource allocation, the higher layer configures whether the SL L1 RSRP is measured based on the PSCCH DMRS or based on the PSSCH DMRS. If the measurement is based on the PSSCH DMRS, as described above, one port or two ports may be configured for the PSSCH DMRS. The terminal needs to define whether the measurement is performed based on one of the two ports or based on the two ports, and compare an L1 RSRP measurement value with the indicated RSRP threshold to determine whether the resource is excluded. If the foregoing is not defined, the transmit end cannot measure the level of the detected RSRP, and consequently a resource exclusion result is inaccurate. Because resources with severer interference are possibly reserved, a resource collision is caused, and the system throughput is reduced.

In summary, during the RSRP measurement, if the DMRS is transmitted based on two ports or two layers, the terminal needs to define whether the measurement is performed based on one of the two ports or based on the two ports. Otherwise, the transmit end cannot measure the level of the RSRP detected by the receive end. Consequently, the path loss calculation is inaccurate, and compensation effects are unbalanced for different links, or inaccurate detection causes a collision in resource selection and makes the system throughput performance worse.

Figure 2:
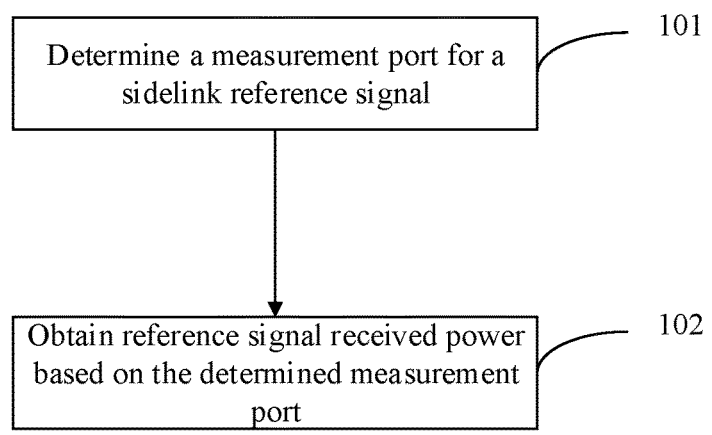
FIG. 2 presents a schematic flowchart of a method for measuring sidelink reference signal received power by a terminal according to an embodiment of the present disclosure.

An embodiment of the present disclosure provides a method for measuring sidelink reference signal received power. The method is applied to a terminal. As shown in FIG. 2, the method includes the following steps.

Step 101: Determine a measurement port for a sidelink reference signal.

Step 102: Obtain reference signal received power based on the determined measurement port.

In this embodiment, the measurement port for the sidelink reference signal is determined, and the reference signal received power is obtained based on the determined measurement port. The obtained reference signal received power may accurately measure a communication status of a receive end. The obtained reference signal received power may be used for power control or used in autonomous resource selection mode to determine an available resource, or the like. In this way, inter-system interference is optimized, and a throughput of a communications system is improved.

Optionally, the measurement port is any one of the following:
  a measurement port determined based on sidelink configuration information; and
  a predefined measurement port.

In this embodiment, the measurement port includes a physical sidelink control channel PSCCH port and/or a physical sidelink shared channel PSSCH port.

Optionally, the sidelink configuration information includes at least one of the following:
  physical sidelink shared channel PSSCH configuration information;
  reference signal configuration information; and physical sidelink control channel PSCCH configuration information.

In this embodiment of the present disclosure, the sidelink configuration information is intended for a first object, and the first object is at least one of the following:
a bandwidth part;
a resource pool;
a sidelink; and
a terminal.

Sidelink configuration information may be configured in units of bandwidth parts, and different sidelink configuration information may be configured for different bandwidth parts; or sidelink configuration information may be configured in units of resource pools, and different sidelink configuration information may be configured for different resource pools; or sidelink configuration information may be configured in units of sidelinks, and different sidelink configuration information may be configured for different sidelinks; or sidelink configuration information may be configured in units of terminals, and different sidelink configuration information may be configured for different terminals.

In an exemplary embodiment of the present disclosure, the sidelink is configured with single-port transmission and/or single-layer transmission, and the measurement port is any one of the following:
a port with a smallest port number;
a port with a largest port number; and
a port with a preconfigured port number.

For example, PSSCH RSRP and/or DMRS RSRP and/or L1 RSRP are/is measured based on a PSSCH and/or DMRS port 1000.

The port number is defined based on a PSSCH. A DMRS is used to represent a PSSCH port. Port numbers are in a one-to-one correspondence with PSSCH DMRS ports. Therefore, a single port is configured for the PSSCH herein, that is, a single port is configured for the PSSCH DMRS.

Optionally, the reference signal received power includes layer 1 reference signal received power L1 RSRP, and a measurement result of the L1 RSRP is a linear average value of energy on resource elements (RE) carrying a reference signal (for example, a DMRS) at configured measurement time-frequency positions.

Optionally, the reference signal received power further includes layer 3 reference signal received power L3 RSRP, and the L3 RSRP is obtained by performing weighting calculation on the L1 RSRP by using a filtering formula and/or a filtering coefficient that are/is predefined, preconfigured, or configured.

Optionally, the L1 RSRP used for calculating the L3 RSRP is at least one of the following:
an RSRP measurement value within a single-port transmission occasion; and
an RSRP measurement value within a multi-port transmission occasion.

The L1 RSRP used for calculating the L3 RSRP is at least one of the following:
an RSRP measurement value within at least N transmission occasions, where N is a predefined, preconfigured, or configured integer, and N may be preconfigured or configured by the terminal or a base station; and
an RSRP measurement value within a predefined, preconfigured, or configured measurement period, where the measurement period may be preconfigured or configured by the terminal or the base station.

In another exemplary embodiment of the present disclosure, the sidelink is configured with multi-port transmission and/or multi-layer transmission, and the measurement port is any one of the following:
all ports configured for sidelink transmission;
a plurality of ports among all ports configured for sidelink transmission; and
one port among all ports configured for sidelink transmission.

For example, PSSCH RSRP and/or DMRS RSRP and/or L1 RSRP may be measured based on a PSSCH and/or DMRS port 1000 or 1001.

Optionally, the one port is any one of the following:
a port with a smallest port number;
a port with a largest port number; and
a port with a preconfigured port number.

Optionally, the reference signal received power includes L1 RSRP, and if the measurement port is a plurality of ports and the plurality of ports use a code division multiplexing mode, the L1 RSRP is any one of the following:
being obtained by first combining and then averaging RSRP measurement values of the plurality of ports;
being obtained by first averaging and then combining RSRP measurement values of the plurality of ports; and
being obtained by multiplying an RSRP measurement value of one of the ports by a preset coefficient.

The averaging may be arithmetic averaging, geometric averaging, harmonic averaging, or the like. The RSRP measurement value is a linear average value of energy on REs carrying a DMRS at configured measurement time-frequency positions. Specifically, during calculation of the L1 RSRP, the measured RSRP values of the plurality of ports or RSRP values of the plurality of layers may be combined first, and then the linear average value of the energy on the REs carrying the DMRS at the configured measurement time-frequency positions is calculated. Alternatively, conversely, the linear average value of the energy on the REs carrying the DMRS at the configured measurement time-frequency positions is first calculated, and then the RSRP values of the plurality of ports or the RSRP values of the plurality of layers are combined.

Optionally, the reference signal received power includes L1 RSRP, and if the measurement port is a plurality of ports, and the plurality of ports use a time division multiple access or frequency division multiple access multiplexing mode, the L1 RSRP is an average value of RSRP measurement values of the plurality of ports or an RSRP measurement value of one of the plurality of ports, where a measurement result of the L1 RSRP is a linear average value of energy on REs carrying a reference signal (for example, a DMRS) at configured measurement time-frequency positions.

The one of the plurality of ports is any one of the following:
a port with a smallest port number among the plurality of ports;
a port with a largest port number among the plurality of ports; and
a port with a preconfigured port number among the plurality of ports.

Optionally, the reference signal received power includes L1 RSRP, and if the measurement port is one of all the ports configured for sidelink transmission, the L1 RSRP is equal to a measured RSRP measurement value of the port multiplied by a preset coefficient when any one of the following conditions is satisfied:

the port uses a code division multiplexing mode;
sidelink multi-port transmission is configured, for example, a port 1000 or 1001 is configured for measurement; and
sidelink multi-layer transmission is configured.

Optionally, the preset coefficient is any one of the following:
- a predefined value;
- a preconfigured value;
- a configured value;
- a value related to a port quantity;
- a value related to a layer quantity; and
- a CDM number, for example, FD-CDM2, which means that CDM multiplexing is performed in frequency domain, and that the CDM number is 2, that is, the preset coefficient is 2.

Optionally, the reference signal received power further includes L3 RSRP, and the L3 RSRP is obtained by performing weighting calculation on the L1 RSRP by using a filtering formula that is predefined, preconfigured, or configured.

Optionally, the L1 RSRP used for calculating the L3 RSRP is at least one of the following:
- an RSRP measurement value within a single-port transmission occasion; and
- an RSRP measurement value within a multi-port transmission occasion.

The L1 RSRP used for calculating the L3 RSRP is at least one of the following:
- an RSRP measurement value within at least N transmission occasions, where N is a predefined, preconfigured, or configured integer, and N may be preconfigured or configured by the terminal or a base station; and
- an RSRP measurement value within a predefined, preconfigured, or configured measurement period, where the measurement period may be preconfigured or configured by the terminal or the base station.

A quantity of configured transmission occasions may be independently configured for a third object, and the third object uses any one of the following:
- single-port transmission;
- multi-port transmission;
- single-port transmission and multi-port transmission;
- single-layer transmission and multi-layer transmission; and
- per resource pool.

Optionally, the filtering formula and/or the filtering coefficient are/is intended for a second object, and the second object is at least one of the following:
- a bandwidth part;
- a resource pool;
- a sidelink; and
- a terminal.

Filtering formulas and/or filtering coefficients may be configured in units of bandwidth parts, and different filtering formulas and/or filtering coefficients may be configured for different bandwidth parts; or filtering formulas and/or filtering coefficients may be configured in units of resource pools, and different filtering formulas and/or filtering coefficients may be configured for different resource pools; or filtering formulas and/or filtering coefficients may be configured in units of sidelinks, and different filtering formulas and/or filtering coefficients may be configured for different sidelinks; or filtering formulas and/or filtering coefficients may be configured in units of terminals, and different filtering formulas and/or filtering coefficients may be configured for different terminals.

In a specific embodiment of the present disclosure, a method for measuring sidelink reference signal received power includes the following steps.

A DMRS transmitted on a port 1000 is predefined for determining DMRS RSRP.

A terminal demodulates SCI, and obtains port configuration information and/or DMRS configuration information.

In a case of a PSSCH with single-port transmission, a measurement result of measuring the DMRS RSRP on the port 1000 is a linear average value of energy on REs carrying the DMRS at configured measurement time-frequency positions, and is a measurement result of layer 1 (L1) RSRP at the moment.

In a case of a PSSCH with two-port transmission, a measurement result of measuring the DMRS RSRP on the port 1000 is a linear average value of energy on REs carrying the DMRS at configured measurement time-frequency positions, and an actually measured energy, which is twice an RSRP measurement value, is a measurement result of L1 RSRP at the moment.

Based on a predefined filtering formula for calculating L3 RSRP and a preconfigured filtering coefficient for calculating an L3 RSRP value, the L3 RSRP is calculated and reported to the transmit end.

Further, L1 RSRP values at different moments may be weighted. In a case of two-port CDM, L1 RSRP is twice a DMRS RSRP measurement value on a single port.

If the transmit end measures RSRP for sensing, the transmit end determines whether a resource is available, and may determine an L1 RSRP value in the foregoing manner.

In another specific embodiment of the present disclosure, a method for measuring sidelink reference signal received power includes the following steps.

Ports 1000 and 1001 are predefined for measuring PSSCH RSRP.

A terminal receives SCI, and obtains port configuration information and/or DMRS configuration information.

In a case of single-port transmission of a PSSCH DMRS, a measurement result of measuring DMRS RSRP on the port 1000 is a linear average value of energy on REs carrying the DMRS at configured measurement time-frequency positions, that is, an RSRP measurement value is a measurement result of L1 RSRP at the moment.

In a case of two-port transmission of a PSSCH, a measurement result of measuring DMRS RSRP on the port 1000 or 1001 is a linear average value of energy on REs carrying the DMRS at configured measurement time-frequency positions, measurement results of the ports 1000 and 1001 are combined, and a combined value is a measurement result of L1 RSRP at the moment.

Based on a predefined filtering formula for calculating L3 RSRP and a preconfigured filtering coefficient for calculating an L3 RSRP value, the L3 RSRP is calculated and reported to the transmit end.

Further, L1 RSRP values at different moments may be weighted. During two-port transmission, the L1 RSRP is a combined value of the DMRS RSRP measurement values on the two ports.

If the transmit end measures RSRP for sensing, the transmit end determines whether a resource is available, and may determine an L1 RSRP value in the foregoing manner.

In another specific embodiment of the present disclosure, a method for measuring sidelink reference signal received power includes the following steps.

A port 1000 is predefined for measuring PSSCH RSRP.

A terminal receives SCI, and obtains port configuration information and/or DMRS configuration information.

In a case of single-port transmission of a PSSCH DMRS, a measurement result of measuring DMRS RSRP on the port 1000 is a linear average value of energy on REs carrying the DMRS at configured measurement time-frequency positions, that is, an RSRP measurement value is a measurement result of L1 RSRP at the moment.

Based on a predefined filtering formula for calculating L3 RSRP and a preconfigured filtering coefficient for calculating an L3 RSRP value, the L3 RSRP is calculated and reported to the transmit end.

Whether and how to measure two ports depend on the terminal. During calculation of an L3 RSRP report value, only a measurement result within a single-port transmission occasion is considered.

If the transmit end measures RSRP for sensing, the transmit end determines whether a resource is available, and may determine an L1 RSRP value in the foregoing manner.

In another specific embodiment of the present disclosure, a method for measuring sidelink reference signal received power includes the following steps.

A port 1000 is predefined for measuring PSSCH RSRP.

A terminal receives SCI, and obtains port configuration information and/or DMRS configuration information.

In a case of single-port transmission of a PSSCH DMRS, a measurement result of measuring DMRS RSRP on the port 1000 is a linear average value of energy on REs carrying the DMRS at configured measurement time-frequency positions, that is, an RSRP measurement value is a measurement result of L1 RSRP at the moment.

In a case of two-port transmission of a PSSCH,
  if FDM or TDM multiplexing is used for two ports, a measurement result of measuring DMRS RSRP on the port 1000 is a linear average value of energy on REs carrying the DMRS at configured measurement time-frequency positions, that is, an RSRP measurement value is a measurement result of L1 RSRP at the moment; or
  if CDM multiplexing is used for two ports, a measurement result of measuring DMRS RSRP on the port 1000 is a linear average value of energy on REs carrying the DMRS at configured measurement time-frequency positions, that is, an RSRP measurement value, and twice an actually measured RSRP measurement value is a measurement result of L1 RSRP at the moment.

Based on a predefined filtering formula for calculating L3 RSRP and a preconfigured filtering coefficient for calculating an L3 RSRP value, the L3 RSRP is calculated and reported to the transmit end.

If the transmit end measures RSRP for sensing, the transmit end determines whether a resource is available, and may determine an L1 RSRP value in the foregoing manner.

In another specific embodiment of the present disclosure, a method for measuring sidelink reference signal received power includes the following steps.

Ports 1000 and 1001 are predefined for measuring PSSCH RSRP.

A terminal receives SCI, and obtains port configuration information and/or DMRS configuration information.

In a case of single-port transmission of a PSSCH DMRS, a measurement result of measuring DMRS RSRP on the port 1000 is a linear average value of energy on REs carrying the DMRS at configured measurement time-frequency positions, that is, an RSRP measurement value is a measurement result of L1 RSRP at the moment.

In a case of two-port transmission of a PSSCH,
  if FDM or TDMmultiplexing is used for two ports, a measurement result of measuring DMRS RSRP on the port 1000 is a linear average value of energy on REs carrying the DMRS at configured measurement time-frequency positions and is a measurement result of L1 RSRP at the moment; or
  if CDM multiplexing is used for the two ports, a measurement result of measuring DMRS RSRP on the port 1000 or 1001 is a linear average value of energy on REs carrying the DMRS at configured measurement time-frequency positions, measurement results of the ports 1000 and 1001 are combined, and a combined value is a measurement result of L1 RSRP at the moment.

Based on a predefined filtering formula for calculating L3 RSRP and a preconfigured filtering coefficient for calculating an L3 RSRP value, the L3 RSRP is calculated and reported to the transmit end.

If the transmit end measures RSRP for sensing, the transmit end determines whether a resource is available, and may determine an L1 RSRP value in the foregoing manner.

Figure 3:
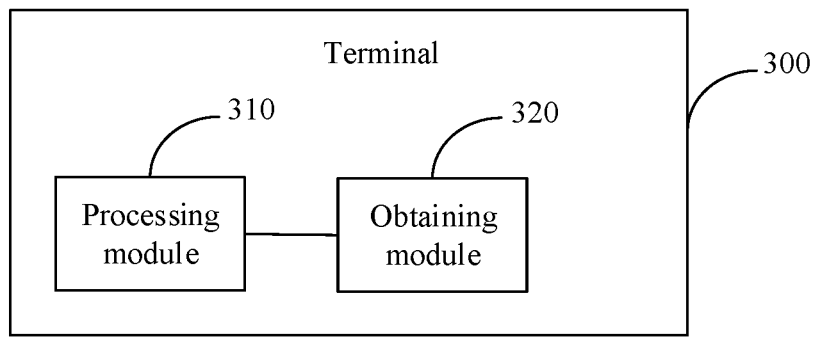
FIG. 3 presents a schematic diagram of a modular structure of a terminal according to an embodiment of the present disclosure.

As shown in FIG. 3, a terminal 300 in an embodiment of the present disclosure includes an apparatus for measuring sidelink reference signal received power, which can implement the method for measuring sidelink reference signal received power in the foregoing embodiment, and achieve the same effect. The terminal 300 specifically includes the following functional modules:
  a processing module 310, configured to determine a measurement port for a sidelink reference signal; and
  an obtaining module 320, configured to obtain reference signal received power based on the determined measurement port.

In this embodiment, the terminal determines the measurement port for the sidelink reference signal, and obtains the reference signal received power based on the determined measurement port. The obtained reference signal received power may accurately measure a communication status of a receive end. The obtained reference signal received power may be used for power control or used in autonomous resource selection mode to determine an available resource, or the like. In this way, inter-system interference is optimized, and a throughput of a communications system is improved.

Optionally, the measurement port is any one of the following:
  a measurement port determined based on sidelink configuration information; and
  a predefined measurement port.

In this embodiment, the measurement port includes a physical sidelink control channel PSCCH port and/or a physical sidelink shared channel PSSCH port.

Optionally, the sidelink configuration information includes at least one of the following:
  physical sidelink shared channel PSSCH configuration information;
  reference signal configuration information; and
  physical sidelink control channel PSCCH configuration information.

The sidelink configuration information is intended for a first object, and the first object is at least one of the following:
  a bandwidth part;
  a resource pool;
  a sidelink; and
  a terminal.

In an exemplary embodiment of the present disclosure, the sidelink is configured with single-port transmission and/or single-layer transmission, and the measurement port is any one of the following:

a port with a smallest port number;
a port with a largest port number; and
a port with a preconfigured port number.

For example, PSSCH RSRP and/or DMRS RSRP and/or L1 RSRP are/is measured based on a PSSCH and/or DMRS port 1000.

The port number is defined based on a PSSCH. A DMRS is used to represent a PSSCH port. Port numbers are in a one-to-one correspondence with PSSCH DMRS ports. Therefore, a single port is configured for the PSSCH herein, that is, a single port is configured for the PSSCH DMRS.

Optionally, the reference signal received power includes layer 1 reference signal received power L1 RSRP, and a measurement result of the L1 RSRP is a linear average value of energy on resource elements (RE) carrying a reference signal (for example, a DMRS) at configured measurement time-frequency positions.

Optionally, the reference signal received power further includes layer 3 reference signal received power L3 RSRP, and the L3 RSRP is obtained by performing weighting calculation on the L1 RSRP by using a filtering formula and/or a filtering coefficient that are/is predefined, preconfigured, or configured.

Optionally, the L1 RSRP used for calculating the L3 RSRP is at least one of the following:
an RSRP measurement value within a single-port transmission occasion; and
an RSRP measurement value within a multi-port transmission occasion.

The L1 RSRP used for calculating the L3 RSRP is at least one of the following:
an RSRP measurement value within at least N transmission occasions, where N is a predefined, preconfigured, or configured integer, and N may be preconfigured or configured by the terminal or a base station; and
an RSRP measurement value within a predefined, preconfigured, or configured measurement period, where the measurement period may be preconfigured or configured by the terminal or the base station.

In another exemplary embodiment of the present disclosure, the sidelink is configured with multi-port transmission and/or multi-layer transmission, and the measurement port is any one of the following:
all ports configured for sidelink transmission;
a plurality of ports configured for sidelink transmission; and
one port among all ports configured for sidelink transmission.

For example, PSSCH RSRP and/or DMRS RSRP and/or L1 RSRP may be measured based on a PSSCH and/or DMRS port 1000 or 1001.

Optionally, the one port is any one of the following:
a port with a smallest port number;
a port with a largest port number; and
a port with a preconfigured port number.

Optionally, the reference signal received power includes L1 RSRP, and if the measurement port is a plurality of ports and the plurality of ports use a code division multiplexing mode, the L1 RSRP is any one of the following:
being obtained by first combining and then averaging RSRP measurement values of the plurality of ports;
being obtained by first averaging and then combining RSRP measurement values of the plurality of ports; and
being obtained by multiplying an RSRP measurement value of one of the ports by a preset coefficient.

The averaging may be arithmetic averaging, geometric averaging, harmonic averaging, or the like. The RSRP value is a linear average value of energy on REs carrying a DMRS at configured measurement time-frequency positions. Specifically, during calculation of the L1 RSRP, the measured RSRP values of the plurality of ports or RSRP values of the plurality of layers may be combined first, and then the linear average value of the energy on the REs carrying the DMRS at the configured measurement time-frequency positions is calculated. Alternatively, conversely, the linear average value of the energy on the REs carrying the DMRS at the configured measurement time-frequency positions is first calculated, and then the RSRP values of the plurality of ports or the RSRP values of the plurality of layers are combined.

Optionally, the reference signal received power includes L1 RSRP, and if the measurement port is a plurality of ports, and the plurality of ports use a time division multiple access or frequency division multiple access multiplexing mode, the L1 RSRP is an average value of RSRP measurement values of the plurality of ports or an RSRP measurement value of one of the plurality of ports, where a measurement result of the L1 RSRP is a linear average value of energy on REs carrying a reference signal (for example, a DMRS) at configured measurement time-frequency positions.

The one of the plurality of ports is any one of the following:
a port with a smallest port number among the plurality of ports;
a port with a largest port number among the plurality of ports; and
a port with a preconfigured port number among the plurality of ports.

Optionally, the reference signal received power includes L1 RSRP, and if the measurement port is one of all the ports configured for sidelink transmission, the L1 RSRP is equal to a measured RSRP measurement value of the port multiplied by a preset coefficient when any one of the following conditions is satisfied:
the port uses a code division multiplexing mode;
sidelink multi-port transmission is configured, for example, a port 1000 or 1001 is configured for measurement; and
sidelink multi-layer transmission is configured.

Optionally, the preset coefficient is any one of the following:
a predefined value;
a preconfigured value;
a configured value;
a value related to a port quantity;
a value related to a layer quantity; and
a CDM number, for example, FD-CDM2, which means that CDM multiplexing is performed in frequency domain, and that the CDM number is 2, that is, the preset coefficient is 2.

Optionally, the reference signal received power further includes L3 RSRP, and the L3 RSRP is obtained by performing weighting calculation on the L1 RSRP by using a filtering formula that is predefined, preconfigured, or configured.

Optionally, the L1 RSRP used for calculating the L3 RSRP is at least one of the following:
an RSRP measurement value within a single-port transmission occasion; and
an RSRP measurement value within a multi-port transmission occasion.

The L1 RSRP used for calculating the L3 RSRP is at least one of the following:
an RSRP measurement value within at least N transmission occasions, where N is a predefined, preconfigured, or configured integer, and N may be preconfigured or configured by the terminal or a base station; and an RSRP measurement value within a predefined, preconfigured, or configured measurement period, where the measurement period may be preconfigured or configured by the terminal or the base station.

A quantity of configured transmission occasions may be independently configured for a third object, and the third object uses any one of the following:

single-port transmission;
multi-port transmission;
single-port transmission and multi-port transmission;
single-layer transmission and multi-layer transmission; and
per resource pool.

Optionally, the filtering formula and/or the filtering coefficient are/is intended for a second object, and the second object is at least one of the following:

a bandwidth part;
a resource pool;
a sidelink; and
a terminal.

Figure 4:
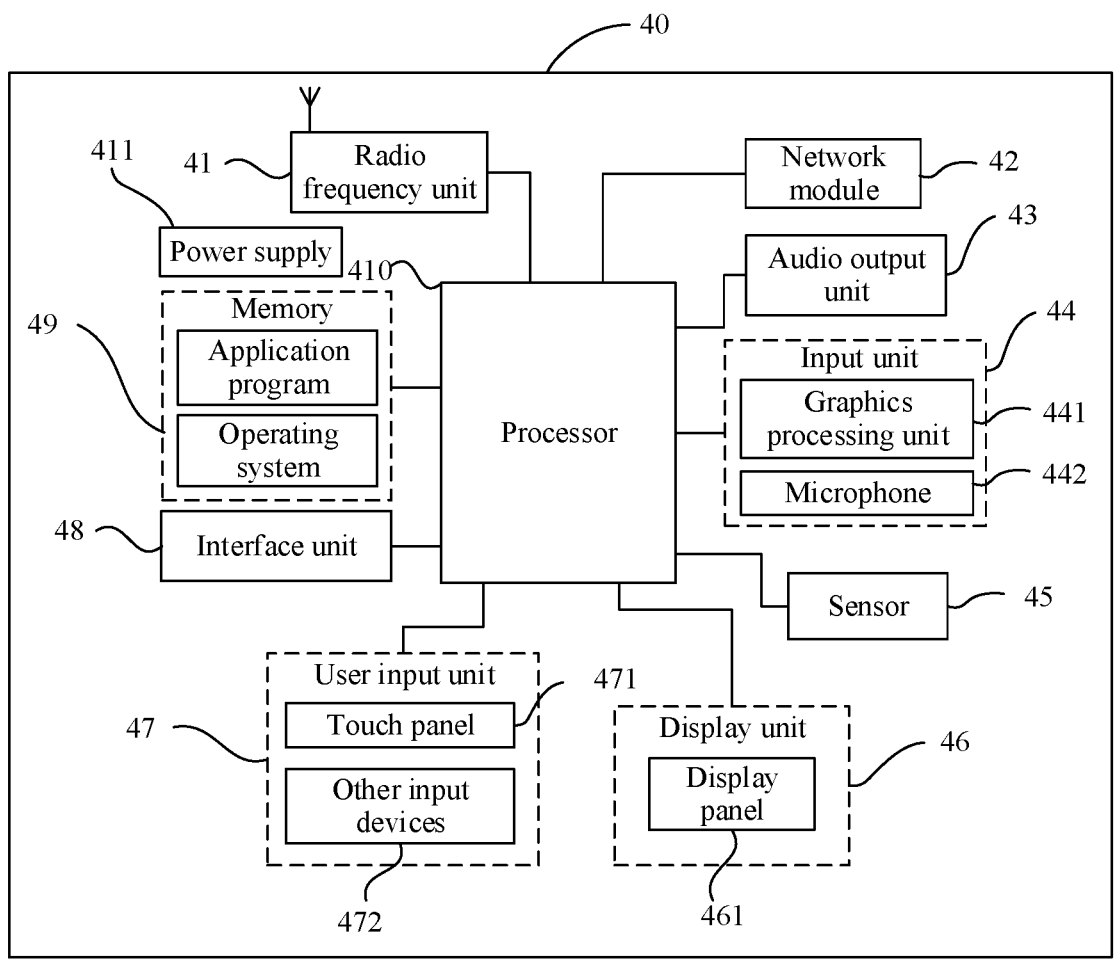
FIG. 4 presents a block diagram of a terminal according to an embodiment of the present disclosure.

To better achieve the foregoing objective, further, FIG. 4 is a schematic diagram of a hardware structure of a terminal for implementing each embodiment of the present disclosure. The terminal 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art may understand that the structure of the terminal shown in FIG. 4 does not constitute any limitation on the terminal. The terminal may include more or fewer components than those shown in the figure, or a combination of some components, or the components disposed differently. In this embodiment of the present disclosure, the terminal includes but is not limited to a mobile phone, a tablet computer, a notebook computer, a palmtop computer, a vehicle-mounted terminal, a wearable device, a pedometer, or the like.

The processor 410 is configured to determine a measurement port for a sidelink reference signal, and obtain reference signal received power based on the determined measurement port.

It should be understood that in this embodiment of the present disclosure, the radio frequency unit 41 may be configured to receive and send signals in an information reception or transmission or call process. Specifically, after receiving downlink data from a base station, the radio frequency unit 41 sends the downlink data to the processor 410 for processing, and in addition, sends uplink data to the base station. Generally, the radio frequency unit 41 includes but is not limited to an antenna, at least one amplifier, a transceiver, a coupler, a low noise amplifier, a duplexer, and the like. In addition, the radio frequency unit 41 may also communicate with a network and other devices via a wireless communications system.

The terminal provides a user with wireless broadband interne access through the network module 42, for example, helping the user transmit and receive e-mails, browse web pages, and access streaming media.

The audio output unit 43 may convert audio data received by the radio frequency unit 41 or the network module 42 or stored in the memory 49 into an audio signal and output the audio signal as a sound. Furthermore, the audio output unit 43 may also provide audio output (for example, a call signal received sound or a message received sound) related to a specific function performed by the terminal 40. The audio output unit 43 includes a speaker, a buzzer, a receiver, and the like.

The input unit 44 is configured to receive an audio or video signal. The input unit 44 may include a graphics processing unit (GPU) 441 and a microphone 442. The graphics processing unit 441 processes image data of a still picture or video obtained by an image capture apparatus (such as a camera) in a video capture mode or an image capture mode. A processed image frame may be displayed on the display unit 46. The image frame processed by the graphics processing unit 441 may be stored in the memory 49 (or another storage medium) or be sent by the radio frequency unit 41 or the network module 42. The microphone 442 is capable of receiving sounds and processing such sounds into audio data. The processed audio data can be converted into a format output that can be sent to a mobile communication base station through the radio frequency unit 41 in a telephone call mode.

The terminal 40 further includes at least one sensor 45, for example, an optical sensor, a motion sensor, and another sensor. Specifically, the optical sensor includes an ambient light sensor and a proximity sensor. The ambient light sensor may adjust luminance of the display panel 461 based on brightness of ambient light, and the proximity sensor may turn off the display panel 461 and/or backlight when the terminal 40 moves close to an ear. As a type of motion sensor, an accelerometer sensor can detect magnitudes of accelerations in all directions (usually three axes), can detect a magnitude and a direction of gravity when the terminal is in a static state, and can be applied to posture recognition (such as screen switching between portrait and landscape, related games, and magnetometer posture calibration) of the terminal, functions related to vibration recognition (such as pedometer and tapping), and the like. The sensor 45 may also include a fingerprint sensor, a pressure sensor, an iris sensor, a molecular sensor, a gyroscope, a barometer, a hygrometer, a thermometer, an infrared sensor, and the like. Details are not described herein.

The display unit 46 is configured to display information input by the user or information provided to the user. The display unit 46 may include the display panel 461, and the display panel 461 may be configured in a form of a liquid crystal display (LCD), an organic light-emitting diode (OLED), or the like.

The user input unit 47 may be configured to receive input digit or character information and generate a key signal input related to user setting and function control of the terminal. Specifically, the user input unit 47 includes a touch panel 471 and other input devices 472. The touch panel 471 is also referred to as a touchscreen and can collect a touch operation (such as an operation performed by the user on the touch panel 471 or near the touch panel 471 with a finger or by using any proper object or accessory such as a stylus) of the user on or near the touch panel 471. The touch panel 471 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 410, and receives a command sent by the processor 410 and executes the command. In addition, the touch panel 471 may be implemented in a plurality of forms, for example, a resistive, capacitive, infrared, or surface acoustic wave touch panel. The user input unit 47 may further include the other input devices 472 in addition to the touch panel 471. Specifically, the other input devices 472 may include but are not limited to a physical keyboard, a function key (such as a volume control key or a switch key), a trackball, a mouse, and a joystick. Details are not described herein.

Further, the touch panel 471 may cover the display panel 461. When detecting a touch operation on or near the touch panel 471, the touch panel 471 transmits the touch operation to the processor 410 to determine a type of a touch event. Then, the processor 410 provides a corresponding visual output on the display panel 461 based on the type of the touch event. Although in FIG. 4, the touch panel 471 and the display panel 461 act as two independent parts to implement input and output functions of the terminal, in some embodiments, the touch panel 471 and the display panel 461 may be integrated to implement the input and output functions of the terminal. This is not specifically limited herein.

The interface unit 48 is an interface between an external apparatus and the terminal 40. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 48 may be configured to receive an input (for example, data information or power) from an external apparatus and transmit the received input to one or more elements within the terminal 40, or may be configured to transmit data between the terminal 40 and the external apparatus.

The memory 49 may be configured to store software programs and various data. The memory 49 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 49 may include a high-speed random access memory, and may further include a non-volatile memory such as a disk storage device, a flash memory device, or another volatile solid-state storage device.

The processor 410 is a control center of the terminal, and is connected to all components of the terminal by using various interfaces and lines. By running or executing a software program and/or module that is stored in the memory 49 and calling data stored in the memory 49, the processor 410 executes various functions of the terminal and processes data, so as to perform overall monitoring on the terminal. The processor 410 may include one or more processing units. Preferably, the processor 410 may integrate an application processor and a modem processor. The application processor mainly processes the operating system, a user interface, an application program, and the like. The modem processor mainly processes wireless communication. It can be understood that the modem processor may alternatively be not integrated in the processor 410.

The terminal 40 may further include the power supply 411 (such as a battery) supplying power to each component. Preferably, the power supply 411 may be logically connected to the processor 410 by using a power management system, so that functions such as charge and discharge management and power consumption management are implemented by using the power management system.

In addition, the terminal 40 includes some functional modules that are not shown. Details are not described herein.

Preferably, an embodiment of the present disclosure further provides a terminal, including a processor 410, a memory 49, a computer program stored in the memory 49 and capable of running on the processor 410. When the computer program is executed by the processor 410, each process of the foregoing embodiment of the method for measuring sidelink reference signal received power is implemented, with the same technical effect achieved. To avoid repetition, details are not described herein again. The terminal may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, or a user device (User Device or User Equipment). This is not limited herein.

An embodiment of the present disclosure further provides a computer readable storage medium, where a computer program is stored in the computer readable storage medium. When the computer program is executed by a processor, each process of the foregoing embodiment of the method for measuring sidelink reference signal received power on the terminal side is implemented, with the same technical effect achieved. To avoid repetition, details are not described herein again. The computer-readable storage medium is, for example, a read-only memory (ROM), a random access memory (RAM), a magnetic disk, or an optical disc.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communications connections through some interfaces, apparatuses or units, and may be implemented in electrical, mechanical, or other forms.

The units described as separate parts may or may not be physically separate and parts displayed as units may or may not be physical units, meaning that they may be located in one position or distributed on a plurality of network elements. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as a separate product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network-side device, or the like) to perform all or some of the steps of the method described in the embodiments of the present disclosure. The foregoing storage medium includes: any medium that can store program code, such as a USB flash drive, a removable hard disk, a ROM, a RAM, a magnetic disk, or an optical disc.

In addition, it should be noted that in the apparatus and method of the present disclosure, apparently, the components or steps may be decomposed and/or recombined. The decomposition and/or recombination should be considered as an equivalent solution of the present disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in the present disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of the present disclosure.

Therefore, an objective of the present disclosure may also be achieved by running a program or a group of programs on any computing apparatus. The computing apparatus may be a well-known general apparatus. Therefore, the objective of the present disclosure may also be achieved by merely providing a program product including program code for implementing the method or apparatus. To be specific, the program product also constitutes the present disclosure, and a storage medium storing the program product also constitutes the present disclosure. Apparently, the storage medium may be any well-known storage medium or any storage medium that will be developed in the future. It should be further noted that in the apparatus and method of the present disclosure, apparently, the components or steps may be decomposed and/or recombined. The decomposition and/or recombination should be considered as an equivalent solution of the present disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are preferred implementations of the present disclosure. It should be noted that a person of ordinary skill in the art may make several improvements or refinements without departing from the principle of the present disclosure and the improvements or refinements shall fall within the protection scope of the present disclosure.

What is claimed is:

1. A method for measuring sidelink reference signal received power, executed by a terminal and comprising:
   determining a measurement port for a sidelink reference signal based on sidelink control information SCI; and
   obtaining reference signal received power based on the determined measurement port;
   wherein in a case of multi-port transmission and/or multi-layer transmission, the measurement port is any one of:
   all ports configured for sidelink transmission; or
   a port 1000 and a port 1001 for sidelink transmission.

2. The method for measuring sidelink reference signal received power according to claim 1, wherein the measurement port is any one of the following:
   a measurement port determined based on sidelink configuration information; and
   a predefined measurement port.

3. The method for measuring sidelink reference signal received power according to claim 2, wherein the sidelink configuration information comprises at least one of the following:
   physical sidelink shared channel PSSCH configuration information;
   reference signal configuration information; and
   physical sidelink control channel PSCCH configuration information.

4. The method for measuring sidelink reference signal received power according to claim 2, wherein the sidelink configuration information is intended for a first object, and the first object is at least one of the following:
   a bandwidth part;
   a resource pool;
   a sidelink; and
   a terminal.

5. The method for measuring sidelink reference signal received power according to claim 1, wherein the reference signal received power comprises L1 RSRP, and if the measurement port is a plurality of ports and the plurality of ports use a code division multiplexing mode, the L1 RSRP is any one of the following:
   being obtained by first combining and then averaging RSRP measurement values of the plurality of ports;
   being obtained by first averaging and then combining RSRP measurement values of the plurality of ports; and
   being obtained by multiplying an RSRP measurement value of one of the ports by a preset coefficient.

6. The method for measuring sidelink reference signal received power according to claim 5, wherein the preset coefficient is any one of the following:
   a predefined value;
   a preconfigured value;
   a configured value;

a value related to a port quantity;
a value related to a layer quantity; and
a CDM number.

7. The method for measuring sidelink reference signal received power according to claim 5, wherein the reference signal received power further comprises layer 3 reference signal received power L3 RSRP; and
the L3 RSRP is obtained by performing weighting calculation on the L1 RSRP by using a filtering formula and/or a filtering coefficient, wherein the filtering formula and/or the filtering coefficient are/is predefined, preconfigured, or configured.

8. The method for measuring sidelink reference signal received power according to claim 1, wherein the reference signal received power comprises L1 RSRP, and if the measurement port is a plurality of ports and the plurality of ports use a time division multiple access or frequency division multiple access multiplexing mode, the L1 RSRP is an average value of RSRP measurement values of the plurality of ports or an RSRP measurement value of one of the plurality of ports.

9. The method for measuring sidelink reference signal received power according to claim 8, wherein the one of the plurality of ports is any one of the following:
a port with a smallest port number among the plurality of ports;
a port with a largest port number among the plurality of ports; and
a port with a preconfigured port number among the plurality of ports.

10. The method for measuring sidelink reference signal received power according to claim 1, wherein the reference signal received power comprises layer 1 reference signal received power L1 RSRP.

11. The method for measuring sidelink reference signal received power according to claim 1,
wherein in a case of single-port transmission and/or single-layer transmission, the measurement port is any one of:
a port with a preconfigured port number; or
a port 1000 for sidelink transmission.

12. A communications device, wherein the communications device comprises a processor, a memory, and a computer program stored in the memory and capable of running on the processor, wherein when the processor executes the computer program, the following steps are implemented:
determining a measurement port for a sidelink reference signal based on sidelink control information SCI; and
obtaining reference signal received power based on the determined measurement port;
wherein in a case of multi-port transmission and/or multi-layer transmission, the measurement port is any one of:
all ports configured for sidelink transmission; or
a port 1000 and a port 1001 for sidelink transmission.

13. The communications device according to claim 12, wherein the reference signal received power comprises layer 1 reference signal received power L1 RSRP.

14. A non-transitory computer-readable storage medium, wherein the computer-readable storage medium stores a computer program, and when the computer program is executed by a processor, the following steps are implemented:
determining a measurement port for a sidelink reference signal based on sidelink control information SCI; and
obtaining reference signal received power based on the determined measurement port;
wherein in a case of multi-port transmission and/or multi-layer transmission, the measurement port is any one of:
all ports configured for sidelink transmission; or
a port 1000 and a port 1001 for sidelink transmission.

* * * * *